United States Patent [19]

Kitchen, Jr.

[11] 3,724,245
[45] Apr. 3, 1973

[54] IGNITION LOCK

[76] Inventor: Ruben P. Kitchen, Jr., Route 3, Box 511, Ashland, Ky. 41101

[22] Filed: July 23, 1971

[21] Appl. No.: 165,641

[52] U.S. Cl. .................................................. 70/431
[51] Int. Cl. .............................................. E05b 15/00
[58] Field of Search ........ 70/252, 431, 447; 200/44, 61.66, 200/42

[56] References Cited

UNITED STATES PATENTS 3,485,969  12/1969  Miller ..................................... 200/44
3,138,700  6/1964  Jacobsen .............................. 340/52
2,057,301  10/1936  Golokow ........................... 200/61.66

Primary Examiner—Robert L. Wolfe
Attorney—Berman, Davidson & Berman

[57] ABSTRACT

A starting switch for a motor vehicle. The switch has a rotary key-operated barrel for energizing the conventional starting motor solenoid switch and has an ignition switch element which is closed by the movement of one of the tumblers caused by inserting the key in the barrel and which remains closed until the key is removed, thereby making it impossible to stop the engine unless the key is removed.

6 Claims, 3 Drawing Figures

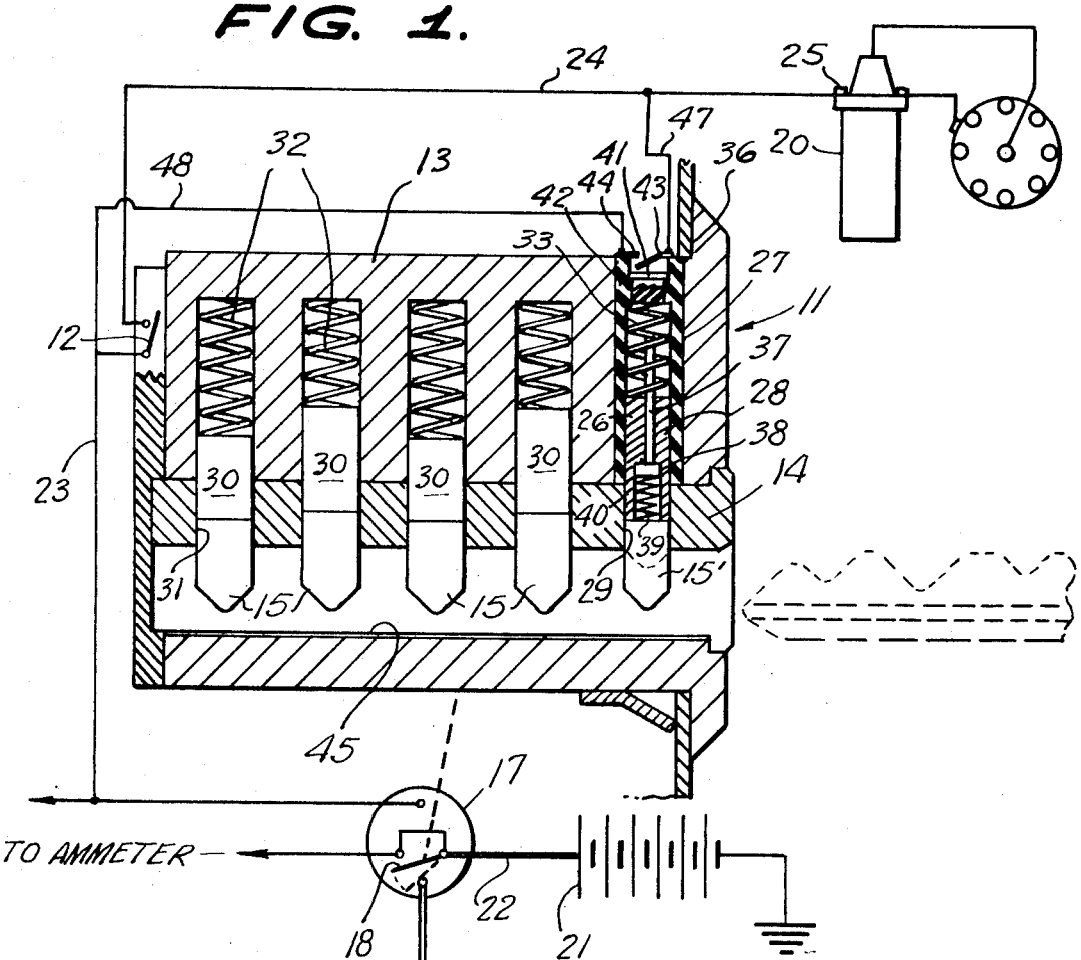
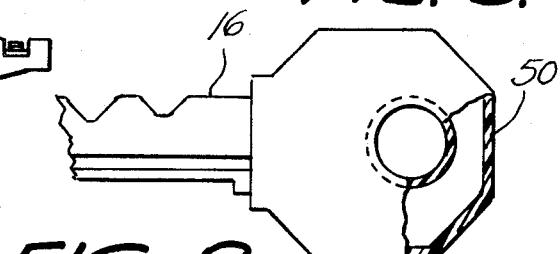
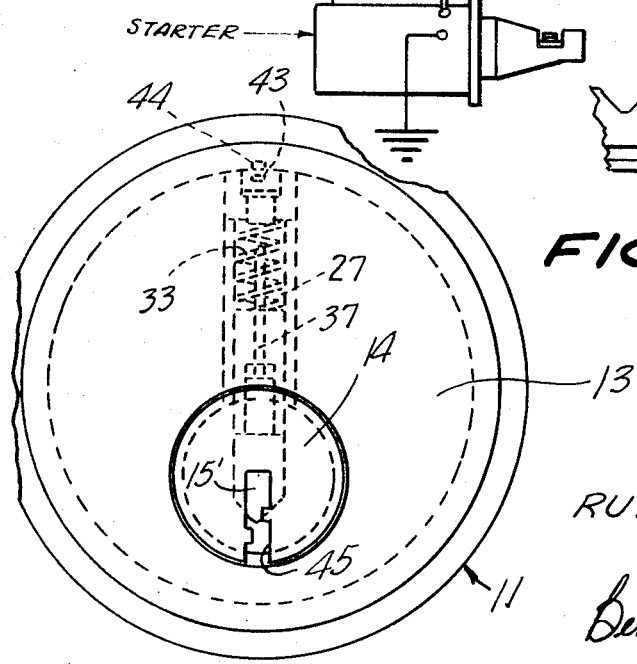

IGNITION LOCK

This invention relates to automobile starting switches, and more particularly to improvements in key-operated starting switches having ignition switch elements therein and provided with anti-theft features.

The main object of the invention is to provide a novel and improved automobile starting switch assembly which is so arranged that the associated automobile engine cannot be stopped while the key remains in the starting switch, thereby reducing the risk of leaving the automobile with the key remaining in the switch.

A further object of the invention is to provide an improved automobile starting switch assembly wherein the ignition circuit remains energized as long as the associated key remains in the assembly, the assembly being simple in construction, being reliable in operation, and requiring merely a slight modification of existing automobile starting switch structures.

A still further object of the invention is to provide an improved automobile starting switch assembly which includes ignition switch means automatically closed responsive to the insertion of a key and which remains closed until the key is removed, thereby making it impossible to stop the engine while the key remains in the switch assembly and thus reducing the possibility of an operator leaving the automobile with the key remaining therein.

Further objects and advantages of the invention will become apparent from the following description and claims, and from the accompanying drawings, wherein:

FIG. 1 is a longitudinal cross-sectional view taken through an improved starting switch assembly constructed in accordance with the present invention and diagrammatically illustrating the electrical connections associated therewith.

FIG. 2 is a fragmentary front elevational view of the starting switch assembly shown in FIG. 1.

FIG. 3 is a fragmentary side elevational view, partly in cross-section, of a typical key which may be employed with the switch assembly of FIGS. 1 and 2.

Referring to the drawings, 11 generally designates an improved automobile starter switch assembly constructed in accordance with the present invention. The assembly 11 comprises a substantially conventional key-operated ignition switch and starter assembly except that it is modified by the provision of a tumbler-operated auxiliary switch element which is connected across the normal ignition switch element 12 of the conventional assembly. Thus, the conventional ignition switch and starter switch assembly comprises a main switch body 13 containing a rotatable key-operated cylinder 14 provided with a plurality of locking tumblers 15 which must be moved to specified positions by the insertion of a proper key 16 to enable the barrel 14 to be rotated by said key. As is well known to those familiar with this art, when the proper key has been inserted, rotation of the barrel 14 to a first position closes the ignition switch element 12 and further rotation of the key in the same direction causes a starter relay 17 to become energized and to close the main starter contacts 18 to thereby energize the starter motor 19. The conventional mechanism is arranged so that after the engine has started and the key is released by the operator, the barrel 14 will remain in a position maintaining the normal ignition switch element 12 closed, whereby the low tension circuit of the associated ignition coil 20 remains energized. With the conventional structure, it is possible for the operator to turn the engine off by rotating the key 16 to its initial position of insertion, which opens the ignition contacts 12. The operator can then leave the vehicle with the key remaining in the barrel 14. This creates a serious invitation to unauthorized persons to start the engine and drive the vehicle away.

In accordance with the present invention, an auxiliary switch is provided which is so arranged that the energizing circuit from the battery 21 to the low tension coil of the ignition coil assembly 20 cannot be deenergized unless the key 16 is actually removed from the barrel 14. Thus, it will be seen from FIG. 1 that the ungrounded battery supply wire 22 is connected through the vehicle ammeter to a wire 23 which is in turn connected through the normal ignition switch contact assembly 12 to the wire 24 leading to the low tension terminal 25 of the ignition coil assembly 20. The pin bore associated with one of the tumblers 15' is enlarged and extended to the exterior of body 13, as shown at 26. A sleeve 27 of insulating material, such as suitable plastic material, is secured in the bore 26. The tumbler pin or stem element 28 associated with the tumbler 15' is slidably engaged in the bore of the sleeve 27 and is engageable in the bore 29 containing the tumbler 15' in the same manner as that in which the remaining tumbler stem or pin elements 30 of the lock assembly are engageable in the bores 31 associated with the other tumblers 15. Thus, the barrel 14 is held against rotation by the locking engagement of the pin or stem elements 30 and 28 in the associated bores 31 and 29. The stem elements 30 are biased to locking engagement by their biasing springs 32, and similarly a biasing spring 33 is provided in the bore of the sleeve 27 which bears between the top end of the stem member 28 and an annular shoulder defined by an internal annular rib 36 provided in the upper portion of sleeve 27.

The stem member 28 is formed with an axial bore slidably containing a rod element 37 having an enlarged bottom head 38 received in a bottom counterbore 39 provided in the lower end portion of stem member 28. A coil spring 40 is provided in the counterbore 39 and bears between the top end of the tumbler element 15' and the enlarged bottom head element 38 of rod 37, biasing rod 37 upwardly. Rod 37 is provided with a flanged top button or head 41 of insulating material slidably engaged in the opening defined by the rib 36 with the top flange 42 of said button or head received in and being slidably movable in the top end portion of the bore of sleeve 27. A flexible contact arm 43 is secured on the top rim of sleeve 27 overlying the button element 41 and movable into engagement with a stationary contact 44 mounted on the rim opposite thereto. The flexible contact arm 43 is flexed upwardly into engagement with the stationary contact 44 by the upward movement of the button element 41 caused by the insertion of the key 16 into the associated keyhole 45 of the lock assembly.

From FIG. 1 it will be seen that the movable contact arm is connected by a wire 47 to the ignition wire 24 and that the stationary contact arm 44 is connected by a wire 48 to the battery wire 23. Thus, the switch contacts 43, 44 are connected across the normal ignition switch element 12 of the assembly, but the switch contacts 43, 44 will remain closed as long as the key 16 is contained in the keyhole 45.

Thus, in using the improved lock assembly, the key 16 is inserted in the keyhole 45, immediately causing the switch contacts 43, 44 to close and thereby energizing the ignition coil 20. The key may then be operated in the usual manner to start the vehicle, the normal ignition contacts 12 being closed when the key has been rotated to a first position and the starting relay 17 being energized when the key is rotated further in the same direction. This closes the starter relay contacts 18 and energizes the starter motor 19, causing the vehicle engine to start. The key is then released and resumes its first position, above described, wherein the normal ignition switch element 12 is closed. When the vehicle is to be stopped, the key 16 must be returned to its original position of insertion, which opens the normal ignition switch 12, but the vehicle engine continues to operate, since the switch contacts 43, 44 remain closed. The operator therefore cannot turn off the engine unless he removes the key 16. This eliminates the possibility of the operator inadvertently leaving the vehicle with the key 16 in the lock, since the operator ordinarily will not leave the vehicle with the engine running, and therefore must extract the key from the lock before he can leave the vehicle.

As shown in FIG. 3, the key may be somewhat modified by the provision of a sheath or covering 50 of insulating material on its handle portion, which protects the operator from possibility of electric shock by insulating the operator's hand from the metal body portion of the key.

As will be apparent, removal of the key 16 from the keyhole 45 releases the tumbler 15' and allows it to descend, which allows the pin or stem element 28 to descend under the biasing force of the spring 33, which acts on the head 38 of rod 37 to move button element 41 down and to release the flexible contact arm 43, causing said contact arm to disengage from stationary contact 44, thereby deenergizing the ignition coil assembly 20. This turns the vehicle engine off, and the engine cannot be thereafter reactivated unless the key 16 is reinserted into the keyhole 45 and rotated, usually in a clockwise direction, sufficiently far to energize the starter relay 17.

It will be noted that the coil spring 40 provided in the recess 39 acts on the enlarged bottom head portion 38 of rod member 37 to bias said rod member to an extended position with respect to the pin or stem member 28, whereas the main biasing spring 33 acts on member 28 to bias it downwardly and to thereby bias button element 41 downwardly, downward movement of said button element being limited by the engagement of its flange 42 with the internal rib 36 of sleeve 27.

While a specific embodiment of an improved motor vehicle starting and ignition switch device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A motor vehicle starting and ignition switch device comprising a body having a key-operated movable element and starter switch means closing responsive to movement of said element to a predetermined position, and ignition switch means on said body closing responsive to insertion of a key in said element, whereby said ignition switch means remains closed as long as the key remains engaged in said movable element and opens only when said key is removed, wherein said movable element comprises a barrel rotatably mounted in said body and having a keyhole to receive a key, wherein said barrel contains at least one tumbler element and said body has movable stem means engaging said tumbler element and normally locking the barrel against rotation, the tumbler element being formed to move said stem means to non-locking position responsive to insertion of the key, wherein said ignition switch means comprises a stationary contact on said body and a movable contact on said body, and means to move said movable contact into engagement with said stationary contact responsive to the movement of said stem means to said non-locking position, and wherein said body is provided with a bore in which said stem means is slidably positioned and wherein said means to move said movable contact comprises a rod element mounted in said stem means and having abutment means at one end thereof engageable with said movable contact.

2. The motor vehicle starting and ignition switch device of claim 1, and wherein said movable contact comprises a conductive spring arm having one end secured to said body and having its free end located in the path of movement of said abutment means.

3. The motor vehicle starting and ignition switch device of claim 2, and wherein said abutment means comprises a button member of insulating material secured on said one end of said rod element.

4. The motor vehicle starting and ignition switch device of claim 3, and wherein said stem means has an axial bore in which said rod element is slidably mounted, and means biasing said rod element to an extended position relative to said stem means.

5. The motor vehicle starting and ignition switch device of claim 4, and wherein said stem means has a counterbore adjacent said tumbler element and said rod element is provided with an enlarged head portion located in said counterbore and said biasing means comprises a spring in said counterbore bearing between said tumbler element and said head portion.

6. The motor vehicle starting and ignition switch device of claim 5, and wherein said bore of the body is provided with an insulating sleeve in which said stem means is slidably positioned, said insulating sleeve having an internal annular rib subjacent said spring arm, said button member being slidably disposed inside said rib and having a top flange engageable on said rib to limit downward movement of said rod element.

* * * * *